US011487944B1

United States Patent
Yang et al.

(10) Patent No.: US 11,487,944 B1
(45) Date of Patent: Nov. 1, 2022

(54) SYSTEM, METHOD, AND COMPUTER PROGRAM FOR OBTAINING A UNIFIED NAMED ENTITY RECOGNITION MODEL WITH THE COLLECTIVE PREDICTIVE CAPABILITIES OF TEACHER MODELS WITH DIFFERENT TAG SETS USING MARGINAL DISTILLATION

(71) Applicant: ASAPP, Inc., New York, NY (US)

(72) Inventors: Yi Yang, New York, NY (US); Keunwoo Peter Yu, Detroit, MI (US)

(73) Assignee: ASAPP, Inc., New York, NY (US)

( * ) Notice: Subject to any disclaimer, the term of this patent is extended or adjusted under 35 U.S.C. 154(b) by 272 days.

(21) Appl. No.: 17/031,564

(22) Filed: Sep. 24, 2020

Related U.S. Application Data

(60) Provisional application No. 62/945,828, filed on Dec. 9, 2019.

(51) Int. Cl.
| | |
|---|---|
| *G06F 40/295* | (2020.01) |
| *G06N 3/04* | (2006.01) |
| *G06N 3/08* | (2006.01) |
| *G06N 20/00* | (2019.01) |

(52) U.S. Cl.
CPC ......... *G06F 40/295* (2020.01); *G06N 3/0454* (2013.01); *G06N 3/08* (2013.01); *G06N 20/00* (2019.01)

(58) Field of Classification Search
CPC .............................. G06F 40/295; G06N 20/00
See application file for complete search history.

(56) References Cited

U.S. PATENT DOCUMENTS

2016/0078339 A1\* 3/2016 Li ..................... G06N 3/084
706/20

FOREIGN PATENT DOCUMENTS

CN 106569998 A \* 4/2017

OTHER PUBLICATIONS

Beryozkin, et al. "A Joint Named-Entity Recognizer for Heterogeneous Tag-sets Using a Tag Hierarchy," Proceedings of the Association for Computational Linguistics (ACL), 2019. (Year: 2019).\*

(Continued)

*Primary Examiner* — Feng-Tzer Tzeng
(74) *Attorney, Agent, or Firm* — Lessani Law Group, PC

(57) ABSTRACT

The present disclosure sets forth a marginal distillation approach to obtaining a unified name-entity recognition (NER) student model from a plurality of pre-trained teacher NER models with different tag sets. Knowledge from the teacher models is distilled into a student model without requiring access to the annotated training data used to train the teacher models. In particular, the system receives a tag hierarchy that combines the different teacher tag sets. The teacher models and the student model are applied to a set of input data sequence to obtain tag predictions for each of the models. A distillation loss is computed between the student and each of the teacher models. If teacher's predictions are less fine-grained than the student's with respect to a node in the tag hierarchy, the student's more fine-grained predictions for the node are marginalized in computing the distillation loss. The overall loss is minimized, resulting in the student model acquiring the collective predictive capabilities of the teacher models.

24 Claims, 7 Drawing Sheets

EXAMPLE SOFTWARE ARCHITECTURE

(56) References Cited

OTHER PUBLICATIONS

Ganin et al., "Unsupervised Domain Adaptation by Backpropagation", In Proceedings of the International Conference on Machine Learning (ICML), 2015.
Hinton et al., "Distilling the Knowledge in a Neural Network", 2015.
Lample et al., "Neural Architectures for Named Entity Recognition", In Proceedings of the North American Chapter of the Association for Computational Linguistics (NAACL), 2016.
Li et al., "Efficient Hyperparameter Optimization and Infinitely Many Armed Bandits", CoRR, 2016.
Kim et al., "Sequence-Level Knowledge Distillation", In Proceedings of Empirical Methods for Natural Language Processing (EMNLP), 2016.
Venkatesan et al., "A Novel Progressive Learning Technique for Multi-class Classification", Neurocomputing, 2016.
Tzeng et al., "Adversarial Discriminative Domain Adaptation", In Proceedings of the IEEE Conference on Computer Vision and Pattern Recognition, 2017.
Chen et al., "Transfer Learning for Sequence Labeling Using Source Model and Target Data", In Proceedings of the National Conference on Artificial Intelligence (AAAI), 2019.
Huang et al., "Learning a Unified Named Entity Tagger From Multiple Partially Annotated Corpora For Efficient Adaptation", In Proceedings of the Conference on Natural Language Learning (CoNLL), 2019.
Tian et al., "Contrastive Representation Distillation", In Proceedings of the International Conference on Learning Representations (ICLR), 2020.
Glorot et al., "Domain Adaptation for Large-Scale Sentiment Classification: A Deep Learning Approach", In Proceedings of the International Conference on Machine Learning (ICML), 2011.
Yang et al., "Design Challenges and Misconceptions in Neural Sequence Labeling", In Proceedings of the 27th International Conference on Computational Linguistics (COLING), 2018.
Bucilua et al., "Model Compression", In Proceedings of Knowledge Discovery and Data Mining (KDD), 2006.
Greenberg et al., "Marginal Likelihood Training of BiLSTM-CRF for Biomedical Named Entity Recognition from Disjoint Label Sets", In Proceedings of Empirical Methods for Natural Language Processing (EMNLP), 2018.
Lafferty et al., "Conditional Random Fields: Probabilistic Models for Segmenting and Labeling Sequence Data", In Proceedings of the International Conference on Machine Learning (ICML), 2001.
Pennington et al., "GloVe: Global Vectors for Word Representation", In Proceedings of Empirical Methods for Natural Language Processing (EMNLP), 2014.
Jie et al., "Better Modeling of Incomplete Annotations for Named Entity Recognition", In Proceedings of the North American Chapter of the Association for Computational Linguistics (NAACL), 2019.
Stubbs et al., "Annotating Longitudinal Clinical Narratives for De-identification: The 2014 i2b2/UTHealth Corpus", Journal of Biomedical Informatics, 2015.
Quattoni et al., "Conditional Random Fields for Object Recognition", In Advances in Neural Information Processing Systems, 2005.
David et al., "Analysis of Representations for Domain Adaptation", In Neural Information Processing Systems (NIPS), 2007.
Mintz et al., "Distant Supervision for Relation Extraction Without Labeled Data", In Proceedings of the Association for Computational Linguistics (ACL), 2009.
Yih et al., "Semantic Parsing via Staged Query Graph Generation: Question Answering with Knowledge Base", In Proceedings of the Association for Computational Linguistics (ACL), 2015.
Beryozkin et al., "A Joint Named-Entity Recognizer for Heterogeneous Tag-sets Using a Tag Hierarchy", In Proceedings of the Association for Computational Linguistics (ACL), 2019.
Rabiner, Lawrence R., "A Tutorial on Hidden Markov Models and Selected Applications in Speech Recognition", Proceedings of the IEEE, 1989.
Blitzer et al., "Domain Adaptation with Structural Correspondence Learning", In Proceedings of Empirical Methods for Natural Language Processing (EMNLP), 2006.
Bellare et al., "Learning Extractors from Unlabeled Text using Relevant Databases", In Sixth International Workshop on Information Integration on the Web, 2007.

* cited by examiner

Tag set 1: TIME, DATE, PERSON
Tag set 2: DATE, DOCTOR, PATIENT, USERNAME

TRAINING A STUDENT NER MODEL FROM A PLURALITY OF TEACHER NER MODELS

System receives a tag hierarchy that combines the heterogeneous tag sets of a plurality of teacher NER models. The tag hierarchy includes parent tags, child tags, and, where applicable, child placeholder tags for hypernym-hyponym relationships in the tag hierarchy.
210

System obtains a set of input data sequences.
220

System applies the student model and each of the plurality of teacher models to the set of input data sequences to obtain tag predictions for each of the models. Student model generates predictions for the most fine-grained tags in the hierarchy, including any placeholder child tags. Each teacher model generates predictions for only the tags for which it is pretrained.
230

System computes a distillation loss between the student model and each teacher model based on the tag predictions from each model. For nodes in the tag hierarchy where a teacher model's predictions are less fine-grained than those of the student model, the student model's predictions for the child tags are marginalized to obtain the student's prediction for the parent tag.
240

System aggregates the distillation losses of each of the student-teacher model pairs to compute an aggregate distillation loss.
250

System computes an overall loss as a function of the aggregate distillation loss
260

System repeats steps 230-260 for a number of iterations, adjusting the parameters of the student model with each iteration to reduce the overall loss.
260

FIG. 2

ADDING STUDENT LOSS AND CONTRASTIVE REPRESENTATION DISTILLATION LOSS TO THE TRAINING METHOD

System receives a tag hierarchy that combines the heterogeneous tag sets of a plurality of teacher NER models. The tag hierarchy includes parent tags, child tags, and, where applicable, child placeholder tags for hypernym-hyponym relationships in the tag hierarchy.
410

↓

System obtains a set of input data sequences.
420

↓

System applies the student model and each of the plurality of teacher models to the set of input data sequences to obtain tag predictions for each of the models. Student model generates predictions for the most fine-grained tags in the hierarchy, including any placeholder child tags. Each teacher model generates predictions for only the tags for which it is pretrained.
430

↓

System computes a distillation loss between the student model and each teacher model based on the tag predictions from each model. For nodes in the tag hierarchy where a teacher model's predictions are less fine-grained than those of the student model, the student model's predictions for the child tags are marginalized to obtain the student's prediction for the parent tag.
440

↓

System aggregates the distillation losses of each of the student-teacher model pairs to compute an aggregate distillation loss.
450

↓

System computes a student loss based on the student model's tag predictions and ground truth hard labels for the input data sequences.
460

EXAMPLE SOFTWARE ARCHITECTURE

SYSTEM, METHOD, AND COMPUTER PROGRAM FOR OBTAINING A UNIFIED NAMED ENTITY RECOGNITION MODEL WITH THE COLLECTIVE PREDICTIVE CAPABILITIES OF TEACHER MODELS WITH DIFFERENT TAG SETS USING MARGINAL DISTILLATION

RELATED APPLICATIONS

This application claims the benefit of U.S. Provisional Application No. 62/945,828 filed on Dec. 9, 2019, and titled "Marginal Distillation from NER Models with Different Tag Sets," the contents of which are incorporated by reference herein as if fully disclosed herein.

BACKGROUND OF THE INVENTION

1. Field of the Invention

This invention relates generally to using machine learning to perform natural language processing and, more specifically, to obtaining a student-named entity recognition model from a plurality of teacher named-entity recognition models with different tag sets using marginal distillation.

2. Description of the Background Art

Named entity recognition (NER) is the task of locating and categorizing spans of text into a closed set of classes, such as people, organizations, and locations. For example, in a text or voice string that includes "San Francisco, Calif.," an NER system may tag "San Francisco, Calif." as a location. As a core information extraction task, NER plays a critical step in a variety of natural language processing applications, such as relation extraction and question answering. Although a number of NER datasets have been created for various domains, there still exists a practical obstacle to apply NER models to a downstream application as there often is a mismatch between the entity types required by the application and the entity types the NER model is trained to recognize. For example, an NER model, may be trained to recognize "time," "date," and "person" entities in a language data sequence. However, a downstream medical application, may need finer granularity on the "person" category, and need the NER system to recognize and distinguish between "doctor" and "patient" entities.

Training typically requires a large data set annotated with the tags the NER model is being trained to recognized. Annotating a training database for the purpose of training an NER model is costly. To address this problem, a number of prior works focus on training an NER model on joint datasets; an existing dataset that was previously annotated and a newly-annotated dataset that includes the additional tags not covered by the existing dataset. Specifically, the following references propose using a marginal conditional random field (CRF) method in which the marginal CRF learns to score a partially observed tag sequence by marginalizing over unobserved paths:

Genady Beryozkin, Yoel Drori, Oren Gilon, Tzivka Hartman, and Idan Szpektor; A joint named-entity recognizer for heterogeneous tag sets using a tag hierarchy, *Proceedings of the Association for Computational Linguistics (ACL)*, 2019.

Nathan Greenberg, Trapit Bansal, Patrick Verga, and Andrew McCallum: Marginal likelihood training of biltsm-crf for biomedical named entity recognition from disjoint label sets, *Proceedings of Empirical Methods for Natural Language Processing (EMNLP)*, 2018.

However, works that focus on joint training a NER model on datasets with multiple tag sets (such as the Greenberg and Beryozkin references above), suffer from two drawbacks. First, they acquire access to the annotated training data. This can be a problem because a substantial amount of NER resources exist in the form of models or services without the corresponding annotated training data. This is especially common when the source domain is of a sensitive nature, such as in medicine and finance. Second, these works ignore the fact that datasets with different tags typically originate from different domains. The unification of two tag sets entails two unsupervised domain adaption tasks. A joint tagger has to overcome domain mismatch and language variations and learn to adapt from a source to an extension target with respect to a source tag set. Therefore, there is demand an NER training method that enables an NER model to be trained on two or more tag sets while addressing these drawbacks.

SUMMARY OF THE DISCLOSURE

The present disclosure describes a system, method, and computer program for obtaining a student named-entity recognition (NER) model from a plurality of pre-trained teacher NER models with different tag sets, wherein the student model acquires the collective predictive capabilities of the teacher models. A marginal distillation approach is used to distill knowledge from the teacher models without requiring access to the annotated training data used to train the teacher models. In particular, the system receives a tag hierarchy that combines the different teacher tag sets in accordance with their semantic relationships. The tag hierarchy includes parent and child tags for hypernym-hyponym relationships in the tag hierarchy. For instances where the child tags do not encompass the full semantic space of the parent tag, the tag hierarchy includes a placeholder child tag to represent the remaining semantic space in the parent tag.

The student model is trained to predict the most fine-grained tags in the tag hierarchy by distilling knowledge from the teacher NER models such that student model acquires the collective predictive capabilities of the teacher models. Specially, the teacher models and the student model are applied to a set of input data sequence to obtain tag predictions for each of the models. The student model predicts the most fine-grained tags in the hierarchy. A distillation loss is computed between the student and each of the teacher models. When a teacher's predictions are less fine-grained than the student's with respect to a node in the tag hierarchy, the student's more fine-grained predictions for the node are marginalized for the purpose of calculating the distillation loss between the student and the teacher. The distillation losses of each of the student-teacher model pairs is aggregated, and an overall loss is calculated as a function of the aggregate distillation loss across all the student-teacher pairs. The parameters of the student model are adjusted over a number of iterations to reduce the overall loss. The result is a unified named-entity recognition model (i.e., the student) with the collective predictive capabilities of the teacher models without the need for the annotated training data used to train the teacher models.

The disclosed method diverges from the typical application of knowledge distillation (i.e., model compression) in which a small model is trained to mimic a pre-trained larger model. In the present method, the student model is trained to be larger than any of the individual teacher models.

In certain embodiments, the overall loss is a function of the aggregate distillation loss and a student loss. The student loss is computed based on the student model's tag predictions and ground truth hard labels for data sequences in the input set. This increases the accuracy of the student model.

In certain embodiments, the overall loss is a function of the aggregate distillation loss, the student loss, and a contrastive representation distillation (CRD) loss. The CRD loss is based on a comparison of the vector representations generated by the teacher models for each of the input data sequences, the vector representations generated by the student model for each of the input data sequences, and the vector representations generated by the student model for negative example data sequences. Including the CRD loss in the overall loss function enables the student to distill domain-invariant knowledge from the teacher models and enables the student model to produce vector representations of input data sequences that are domain insensitive or less domain sensitive than they would otherwise be.

BRIEF DESCRIPTION OF THE DRAWINGS

FIG. 2 is a flowchart that illustrates a method, according to one embodiment, for obtaining a student named-entity recognition model from a plurality of teacher named-entity recognition models with different tag sets.

FIGS. 4A-4B are flowcharts that illustrate a further embodiment of the method of FIG. 2 in which the overall loss includes a student loss and a contrastive representation distillation loss.

DETAILED DESCRIPTION OF THE PREFERRED EMBODIMENTS

The present disclosure describes a system, method, and computer program for obtaining a student named-entity recognition (NER) model from a plurality of teacher NER models with different tag sets, wherein the student model acquires the collective predictive capabilities of the teacher models. The method is performed by a computer system ("the system"). As described below with respect to FIGS. 1-5, the system receives a tag hierarchy that aligns the tags of the different teacher tag sets, and then transfers knowledge from the teacher models to the student models using a marginal distillation approach.

The term "teacher" or "teacher model" herein refers to a teacher name-entity recognition model. Likewise, the term "student" or "student model" refers to a student named-entity recognition model.

1. Obtaining a Tag Hierarchy that Combines Different Tag Sets

FIG. 2 illustrates an embodiment of the method. The system receives a tag hierarchy that combines the different tag sets of the teacher NER models in accordance with their semantic relationships (step 210). The teacher tag sets are disjoint or heterogenous in that they do not have all the same tags, and they may or may not have some tags in common. The tag hierarchy may be created and inputted into the system by a data scientist or other person.

Figure 1A:
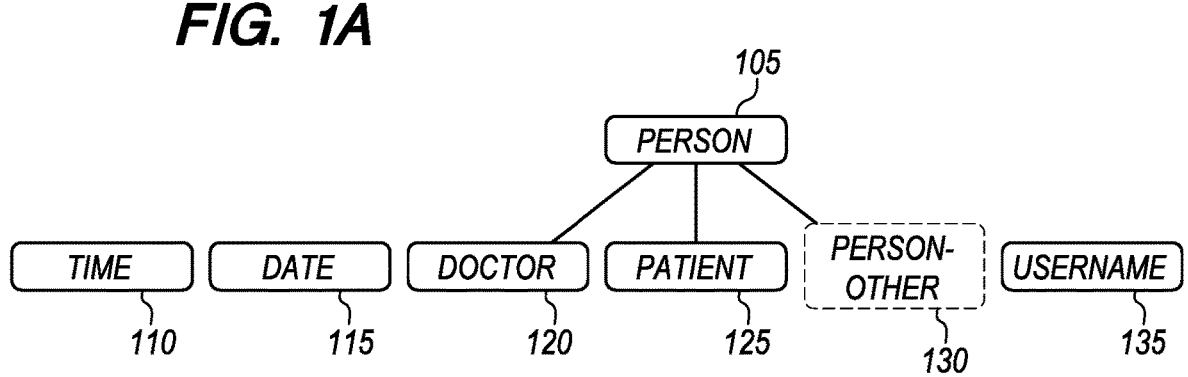
FIG. 1A illustrates an example tag hierarchy that combines tags from two tag sets.

As illustrated in FIG. 1A, a tag hierarchy may be a direct acyclic graph (DAG) in which each node represents a semantic tag of a label set. The tag hierarchy illustrated in FIG. 1A combines two tag sets: one with the tags TIME, DATE, and PERSON, which are represented by nodes 110, 115, and 105 in the tag hierarchy, and the other with the tags DATE, DOCTOR, PATIENT, and USERNAME, which are represented by nodes 115, 120, 125, and 135. The DATE tag is in both tag sets.

The tag hierarchy includes parent and child tags for hypernym and hyponym relationships in the tag hierarchy. A directed edge between the parent node p and the child node c, p→c, indicates that c is a hyponym or a finer-grained tag of p, and c captures a subset of the semantics of p. The example tag hierarchy illustrated in FIG. 1A includes three directed edges, one between PERSON (105) and DOCTOR (120), one between PERSON and PATIENT (125), and one between PERSON and PERSON-OTHER (130). These directed edges capture the semantic relationships between PERSON, PATIENT, DOCTOR, AND PERSON-OTHER, indicating that PERSON is the parent or hypernym tag, and DOCTOR, PATIENT and PERSON-OTHER are the child or hyponym tags. In instances, where the child tags of a parent tag do not encompass the full semantic space of the parent tag, the tag hierarchy includes a placeholder child tag to represent the remaining semantic space of the parent tag. In the example of FIG. 1A, PERSON-OTHER is a place holder tag to capture the remaining semantic space of PERSON not captured by DOCTOR or PATIENT.

2. Marginally Distilling Knowledge from a Plurality of Teacher NER Models

The system obtains a set of input data sequences for use in transferring knowledge from the teacher models to the student model (step 220). An example of input data sequences are text strings. Each input data sequence includes one or more tokens. For text strings, the individual words in the string each may be treated as a token. Knowledge can be distilled from various teacher models using only the one set of input data sequences; there is no requirement that knowledge be distilled using the various data sets on which the teacher models were trained. The set of input data sequences may be different from any of the data sets used to train the teacher models. An example of a set of input data sequences is OntoNotes 5.0 (see Ralph Weischedel, Martha Palmer, Mitchell Marcus, Eduard Hovy, Sameer Praadhan, Lance Ramshaw, Nianwen Xue, Ann Taylor, Jeff Kaufman, Michelle Franchini, et al; Ontonotes release 5.0 ldc201329, *Linguistic Data Consortium*, Philadelphia, Pa., 2013, the contents of which are incorporated by reference herein).

Figure 1B:
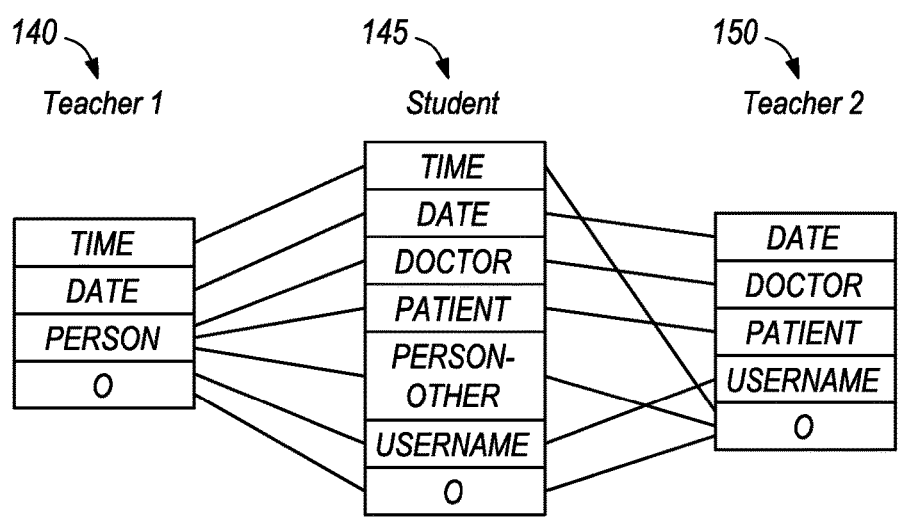
FIG. 1B illustrates an example of the knowledge a student named-entity recognition model distills from two teacher named-entity recognition models with different tag sets.

The system applies the student model and each of the plurality of teacher models to the set of input data sequences to obtain tag predictions for each of the models (step 230). In one embodiment, each model generates a tag probability distribution for each token within the input data sequences, indicating, for each tag for which the model makes a prediction, the probability of the token being the tag. The student model generates predictions for the most finegrained tags in the hierarchy, including any placeholder child tags, whereas each teacher model generates predictions for only the tags for which it is pretrained. FIG. 1B illustrates an example. In this example, the "Teacher 1" model (140) is pretrained to predict tag set 1 (TIME, DATE, and PERSON), and the "Teacher 2" model (150) is pretrained to predict tag set 2 (DATE, DOCTOR, PATIENT, and USER-NAME). The "O" tag is for entities that are not recognized as one of the tags. Therefore, with respect to the input data sequence, Teacher 1 generates predictions for TIME, DATE, PERSON, and O, and Teacher 2 generates predictions for DATE, DOCTOR, PATIENT, USERNAME, and O. The student model (145) predicts the most fine-grained tags in the hierarchy, namely TIME, DATE, DOCTOR, PATIENT, PERSON-OTHER, USERNAME, and O.

The system computes a distillation loss between the student model and each teacher model based on the tag predictions from each model. For nodes in the tag hierarchy where a teacher model's predictions are less fine-grained than those of the student model, the student model's predictions for the child tags are marginalized to obtain the student's predictions for the parent tag (step 240). For example, in calculating a distillation loss between the student model and Teacher 1 in FIG. 1B, the system marginalizes the student predictions for DOCTOR, PATIENT, and PERSON-OTHER to obtain the student's prediction for PERSON. In other words, the student's predicted probability that an entity is a PERSON is the sum of its predicted probabilities that the entity is a DOCTOR, PATIENT, or PERSON-OTHER. Whether the student's predictions for child nodes with the same parent are marginalized depends on the applicable teacher from which a distillation loss is being calculated. In the example illustrated in FIG. 1B, the Student's predictions for DOCTOR, PATIENT, and PERSON-OTHER are marginalized in calculating a distillation loss between Teacher 1 and the Student because Teacher 1 can only predict PERSON and not DOCTOR, PATIENT, and PERSON-OTHER (i.e., with respect to these nodes, the Student is only able to distill knowledge from Teacher 1 at the level of the PERSON node). On the other hand, the student predictions for PATIENT, DOCTOR, and PERSON-OTHER are not marginalized in calculating a distillation loss between the Student and Teacher 2 because Teacher 2 is pretrained to predict PATIENT, DOCTOR, and PERSON-OTHER and, thus, the Student can distill knowledge at the more fine-grained level from Teacher 2.

The system aggregates the distillation losses of each of the student-teacher model pairs to compute an aggregate distillation loss (step 250). The system computes an overall loss as function of the aggregate distillation loss (step 260). In certain embodiments, the overall loss may be equal to the aggregate distillation loss. In other embodiments, it may also include other losses, such as a student loss or a contrastive representation distillation (CRD) loss, as described below with respect to FIGS. 3A-3B and 4A-4B. The system repeats steps 230-260 for a number of iterations, adjusting the parameters of the student model with each iteration to reduce the overall loss (step 270). The steps may be repeated for a fixed number of iterations or until convergence is achieved. The result is a unified named-entity recognition model (i.e., the student) with the collective predictive capabilities of the teacher models without the need for the annotated training data used to train the teacher models.

In one embodiment, the method for calculating the individual distillation losses for each student-teacher pair and for calculating the aggregate distillation loss is expressed mathematically as follows:

Given the k-th teacher trained on annotations from a domain $D_k$ and an input sequence $x^k = \{x_1, x_2, \ldots, x_T\}$ of the same domain, a distillation loss is computed between the predicted tag sequence of the student model and that of the teacher model as set forth below:

$$\ell_{KD}(x^{(k)}) = -\sum_{t=1}^{T}\sum_{i=1}^{L_k} q_{t,i} \log P_{t,i} \quad \text{Equation 1}$$

Where $q_{t,i}$ is the soft target label for class i in the k-th teacher's tag set, $L_k$ is the number of labels in the k-th teacher's tag set, and $p_{t,i}$ can be obtained by summing the student's probabilities of tag i's descendant fine-grained tags in the hierarchy, as set forth below:

$$p_{t,i} = \sum_{j \in DescendentLeaf(i)} p_{t,j} \quad \text{Equation 2}$$

Where $p_{t,j}$ is the predicted probability from the student for the j-th class in the unified tag set. The aggregate distillation loss computed with K teachers is:

$$\mathcal{L}_{KD} = \sum_{k=1}^{K}\sum_{n=1}^{N_k} \ell_{KD}(x_n^{(k)}) \quad \text{Equation 3}$$

Where $\mathcal{L}_{KD}$ denotes the aggregate distillation loss, and $N_k$ denotes the number of instances (i.e., the number of data sequences) in $D_k$.

The student and teacher NER models are neural networks, such as convolution neural networks, recurrent neural networks (RNNs), long short-term neural networks (LSTMs), and transformer neural networks.

In certain embodiments, the student and teacher NER models are neural networks with a conditional random field (CRF) output layer. In such cases, the system trains the student CRF model by enforcing the token-level marginals produced by the teacher CRF model. The marginal probability of a token t being tagged as class i is:

$$p_{t,i} = p(y=i|x) \quad \text{Equation 4}$$

Which can be efficiently computed by the Forward-Backward algorithm. The CRF distillation loss can be obtained by replacing the softmax probabilities in Equation 1 with the CRF node marginals.

3. Adding Student Loss

Figure 3A:
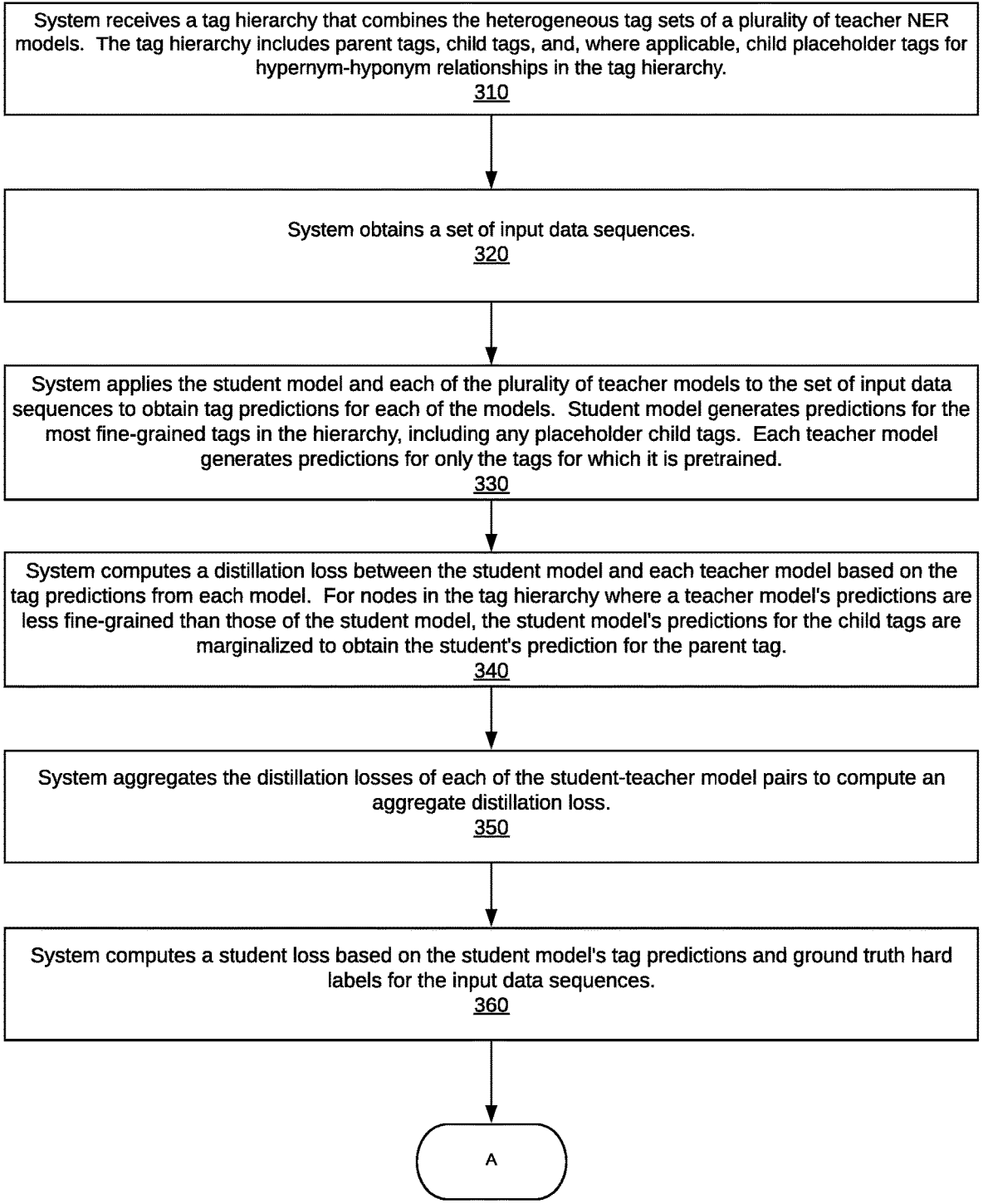
FIGS. 3A-3B are flowcharts that illustrate a further embodiment of the method of FIG. 2 in which the overall loss includes a student loss.
Figure 3B:
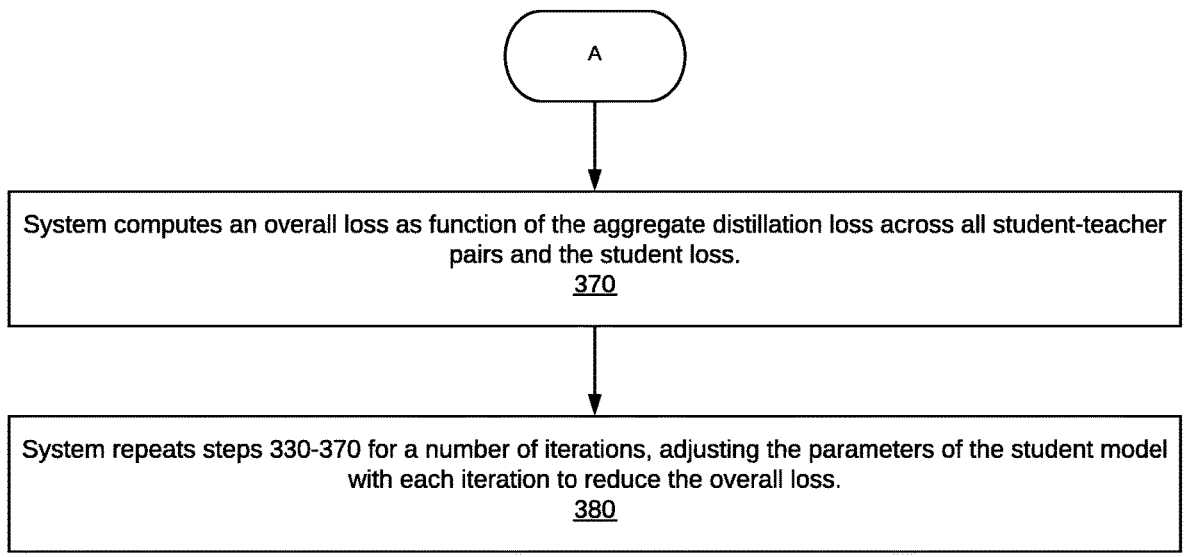

FIGS. 3A-3B illustrate a further embodiment of the method for obtaining the student NER model from a plurality of teacher NER models. Steps 310-350 are the same 210-250 in FIG. 2. However, in addition to calculating an aggregate distillation loss, which is a measure of the difference in predictions between the student model and each of the teacher models, the system also calculates a "student loss," which is a measure of the difference in the student model's prediction and ground truth hard labels for the input data sequences (step 360). Including a student loss in the overall loss increases the accuracy of the student model. In one embodiment, the student loss, notated as $\mathcal{L}_{NLL}$ herein, is calculated by replacing the soft target label q with the ground truth label in Equation 1. The system computes an overall loss as a function of the aggregate distillation loss across all student-teacher pairs and the student loss (step 370). In one embodiment, the overall loss is a linear combination of the distillation loss and the student loss, as expressed below:

$$\mathcal{L}_{KD\text{-}NLL} = (1-\alpha)\mathcal{L}_{KD} + \alpha\mathcal{L}_{NLL} \qquad \text{Equation 5}$$

The system repeats steps 330-370 for a number of iterations, adjusting the parameters of the student model with each iteration to reduce the overall loss (step 380). The steps may be repeated for a fixed number of iterations or until convergence is achieved.

4. Adding Contrastive Representation Distillation Loss

Figure 4B:
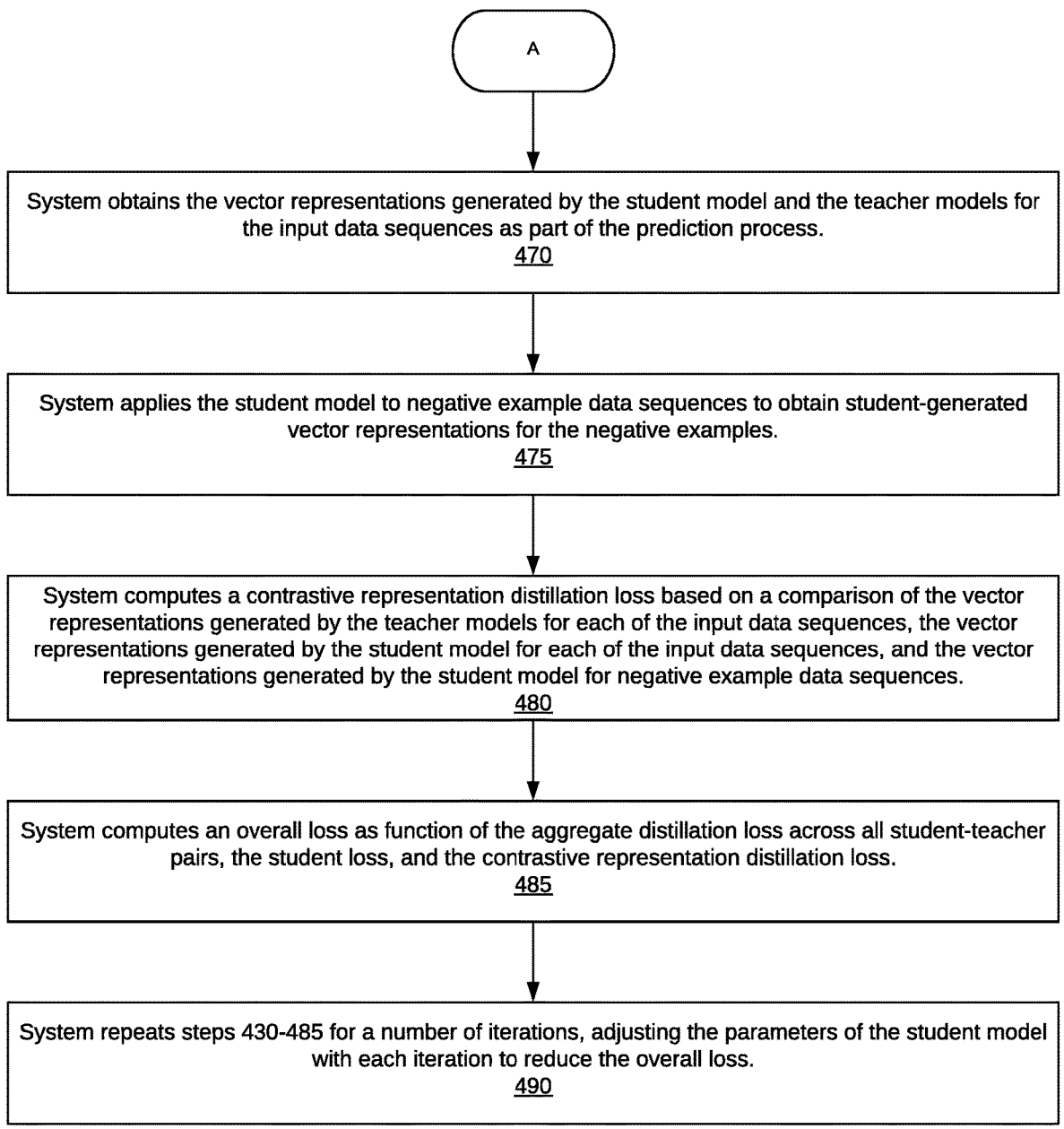

FIGS. 4A-4B illustrate a further embodiment of the method for obtaining the student NER model from a plurality of teacher NER models. Steps 410-460 are the same as steps 310-360. However, in addition to computing an aggregate distillation loss and a student loss, the system also computes a contrastive representation distillation (CRD) loss. A contrastive representation distillation loss between the student model and a teacher model is a measure of the differences between vector representations generated by the two models for the input data sequences as part of the prediction process. Minimizing this loss enables the student to distill domain-invariant knowledge from the teacher models and enables the student model to produce vector representations of input data sequences that are domain insensitive (or at least less domain sensitive than would otherwise be). This in turn enables the student model to adapt to and to perform better on another domain (i.e., on a domain that is different from the one on which it was trained).

To compute the contrastive representation distillation loss, the system obtains the vector representations generated by the student model and the teacher models for the input data sequences as part of the prediction process (step 470). The system also applies the student model to negative example data sequences to obtain student-generated vector representations for the negative examples (step 475). The system then computes a contrastive representation distillation loss based on a comparison of the vector representations generated by the teacher models for each of the input data sequences, the vector representations generated by the student model for each of the input data sequences, and the vector representations generated by the student model for negative example data sequences (step 480).

The system computes an overall loss as a function of the aggregate distillation loss across all student-teacher pairs, the student loss, and the contrastive representation distillation loss (step 485). The system repeats steps 430-485 for a number of iterations, adjusting the parameters of the student model with each iteration to reduce the overall loss (step 490). The steps may be repeated for a fixed number of iterations or until convergence is achieved.

In one embodiment, the contrastive representation distillation loss is computed as follows:

Let the vector representations of an input data sequence x produced by the k-th teacher be $f^{T_k}(x)$ and by student be $f^S(x)$. A data sequence from the set of input data sequences is treated as a positive example x, and M other randomly sampled data sequences $\{x'_m\}_{m=1}^{M}$ are treated as negative examples. Let the vector representations of the data sequence $x'_m$ be $f^S(x'_m)$. A contrastive loss is then utilized to distinguish between the positive and negative examples:

$$\ell_{CRD}^{(k)}(x) = -\log\bigl(h(f^{T_k}(x), f^S(x))\bigr) - \sum_{m=1}^{M}\log\bigl(1 - h(f^{T_k}(x), f^S(x'_m))\bigr), \qquad \text{Equation 6}$$

Where $h(v, v') = \text{sigmoid}(v^T v'/\tau)$ and $\tau$ is a temperature that adjusts the concentration level. To learn domain-invariant representations on data drawn from $D_k$, the system maximizes the mutual information between the student representation and each of the teacher representations by calculating the final CRD loss that as follows:

$$\mathcal{L}_{CRD} = \sum_{k=1}^{K}\sum_{n=1}^{N_k}\sum_{k'=1}^{K} \ell_{CRD}^{(k')}(x_n^{(k)}) \qquad \text{Equation 7}$$

In contrast to Equation 3 above, which distills knowledge from the k-th teacher with only in-domain data, the CRD loss encourages the model to distill domain invariant knowledge of a teacher using both in-domain and out-domain data. The system calculates the overall loss as a function of the distillation loss, the student loss, and the CRD loss as set forth below:

$$\mathcal{L}_{overall} = \mathcal{L}_{KD\text{-}NLL} + \beta\mathcal{L}_{CRD} \qquad \text{Equation 8}$$

5. Using the Trained Student Model to Make Predictions on other Data Sets

After the student model has acquired the predictive capabilities of the teacher models, it can be applied to other domains and data sets (i.e., a data set other than data set used train the student) to make tag predictions with respect to the tags in the tag hierarchy. For example, it can be used to perform natural language processing of another data set.

6. Example Software Architecture

Figure 5:
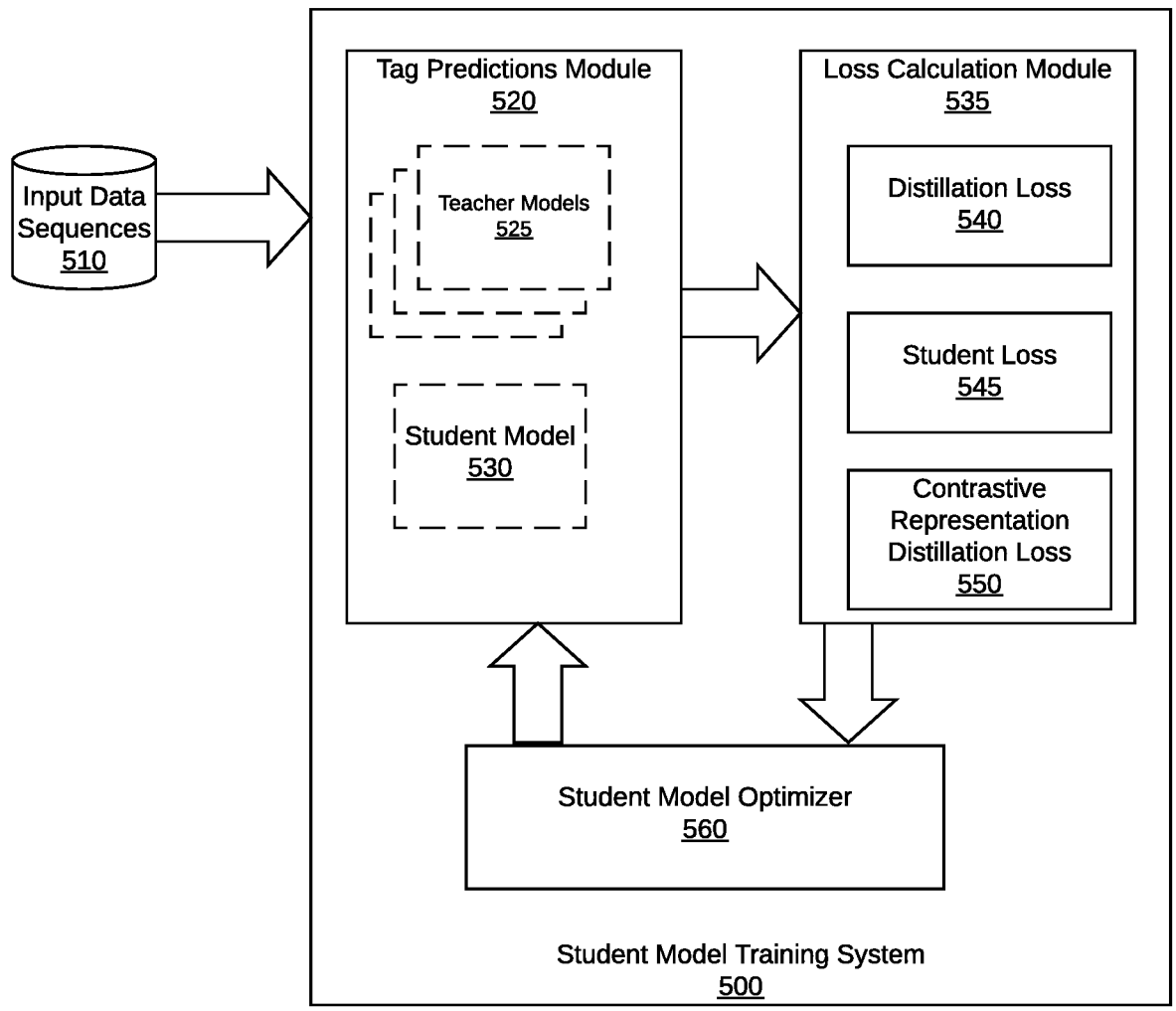
FIG. 5 is a block diagram that illustrates an example software architecture.

FIG. 5 illustrates an example system for performing the methods described herein. The methods described herein may be implemented in other systems and are not limited to system 500. The system 500 includes a Tag Predictions Module 520, a Loss Calculation Module 535, and a Student Model Optimizer 560. The Tag Prediction Modules 520 applies the teacher models 525 and the student model 530 to input data sequences 510 to obtain the tag predictions. The Loss Calculation Module 535 includes a Distillation Loss Submodule 540 which calculates the distillation losses. In certain embodiments, the Loss Calculation Module 535 also includes a Student Loss Submodule 545 and CRD Loss Submodule 550 for calculating a student loss and a CRD loss, respectively, as described above. The Student Model Optimizer 560 adjusts the parameters of the student model with each iteration to reduce the overall loss.

7. General

The methods described herein are embodied in software and performed by a computer system (comprising one or more computing devices) executing the software. A person skilled in the art would understand that a computer system has one or more physical memory units, disks, or other physical, computer-readable storage media for storing software instructions, as well as one or more processors for executing the software instructions.

As will be understood by those familiar with the art, the invention may be embodied in other specific forms without departing from the spirit or essential characteristics thereof. Accordingly, the above disclosure is intended to be illustrative, but not limiting, of the scope of the invention, which is set forth in the following claims.

The invention claimed is:

1. A method for obtaining a student named-entity recognition (NER) model from a plurality of teacher NER models with different tag sets, wherein the student NER model acquires the collective predictive capabilities of the plurality of teacher NER models, the method comprising:
   receiving a tag hierarchy that combines the different tag sets of the teacher NER models, wherein the tag hierarchy includes parent and child tags for hypernym-hyponym relationships in in the tag hierarchy and wherein, in instances where the child tags of a parent tag do not encompass the full semantic space of the parent tag, the tag hierarchy includes a placeholder child tag to represent the remaining semantic space of the parent tag;
   training the student NER model to predict the most fine-grained tags in the tag hierarchy by distilling knowledge from the plurality of teacher NER models such that the student NER model acquires the collective predictive capabilities of the plurality of teacher NER models, wherein training the student NER model comprises the following steps:
   (a) obtaining a set of input data sequences;
   (b) applying the student NER model and each of the plurality of teacher NER models to the set of input data sequences to obtain tag predictions from each of the teacher and student models, wherein, for hypernym-hyponym relationships in the tag hierarchy, the student model generates tag predictions for the child tags corresponding to the hyponyms, including any placeholder child tags;
   (c) computing a distillation loss between the student model and each teacher model based on the tag predictions of the two models for each of the data sequences in the input set, wherein, in response to a teacher model being able to predict a parent tag and not the corresponding child tags, the student model's predictions for the corresponding child tags are marginalized to obtain the student NER model's prediction for the parent tag for purposes of computing the distillation loss;
   (d) aggregating the distillation losses of each of the student-teacher model pairs to compute an aggregate distillation loss;
   (e) computing an overall loss as a function of the aggregate distillation loss; and
   (f) repeating steps (b)-(e) for a number of iterations, wherein parameters of the student NER model are adjusted with each iteration to reduce the overall loss.

2. The method of claim 1, wherein the set of input data sequences is different from the data sequences used to train the teacher NER models.

3. The method of claim 1, wherein the overall loss equals the aggregate distillation loss.

4. The method of claim 1, further comprising:
   in each iteration, computing a student loss based on the student NER model's tag predictions and ground truth hard labels for data sequences in the input set; and
   computing the overall loss as a function of the aggregate distillation loss and the student loss.

5. The method of claim 4, further comprising:
   in each iteration, computing a contrastive representation distillation loss based on a comparison of the vector representations generated by the teacher NER models for each of the input data sequences, the vector representations generated by the student NER model for each of the input data sequences, and the vector representations generated by the student NER model for negative example data sequences; and
   computing the overall loss as a function of aggregate distillation loss, the student loss, and the contrastive representation distillation loss.

6. The method of claim 1, wherein the student and teacher NER models are neural networks.

7. The method of claim 1, wherein one or more of the student and teacher NER models is a neural network with a conditional random field output layer.

8. The method of claim 1, further comprising:
   applying the student NER model to a second set of input data sequences to obtain tag predictions for the second set.

9. A non-transitory computer-readable medium comprising a computer program, that, when executed by a computer system, enables the computer system to perform the following method obtaining a student named-entity recognition (NER) model from a plurality of teacher NER models with different tag sets, wherein the student NER model acquires the collective predictive capabilities of the plurality of teacher NER models, the method comprising:
   receiving a tag hierarchy that combines the different tag sets of the teacher NER models, wherein the tag hierarchy includes parent and child tags for hypernym-hyponym relationships in in the tag hierarchy and wherein, in instances where the child tags of a parent tag do not encompass the full semantic space of the parent tag, the tag hierarchy includes a placeholder child tag to represent the remaining semantic space of the parent tag;
   training the student NER model to predict the most fine-grained tags in the tag hierarchy by distilling knowledge from the plurality of teacher NER models such that the student NER model acquires the collective predictive capabilities of the plurality of teacher NER models, wherein training the student NER model comprises the following steps:
   (a) obtaining a set of input data sequences;
   (b) applying the student NER model and each of the plurality of teacher NER models to the set of input data sequences to obtain tag predictions from each of the teacher and student models, wherein, for hypernym-hyponym relationships in the tag hierarchy, the student model generates tag predictions for the child tags corresponding to the hyponyms, including any placeholder child tags;
   (c) computing a distillation loss between the student model and each teacher model based on the tag predictions of the two models for each of the data sequences in the input set, wherein, in response to a teacher model being able to predict a parent tag and not the corresponding child tags, the student model's predictions for the corresponding child tags are marginalized to obtain the student NER model's prediction for the parent tag for purposes of computing the distillation loss;
   (d) aggregating the distillation losses of each of the student-teacher model pairs to compute an aggregate distillation loss;

(e) computing an overall loss as a function of the aggregate distillation loss; and
(f) repeating steps (b)-(e) for a number of iterations, wherein parameters of the student NER model are adjusted with each iteration to reduce the overall loss.

10. The non-transitory computer-readable medium of claim 9, wherein the set of input data sequences is different from the data sequences used to train the teacher NER models.

11. The non-transitory computer-readable medium of claim 9, wherein the overall loss equals the aggregate distillation loss.

12. The non-transitory computer-readable medium of claim 9, further comprising:
in each iteration, computing a student loss based on the student NER model's tag predictions and ground truth hard labels for data sequences in the input set; and
computing the overall loss as a function of the aggregate distillation loss and the student loss.

13. The non-transitory computer-readable medium of claim 12, further comprising:
in each iteration, computing a contrastive representation distillation loss based on a comparison of the vector representations generated by the teacher NER models for each of the input data sequences, the vector representations generated by the student NER model for each of the input data sequences, and the vector representations generated by the student NER model for negative example data sequences; and
computing the overall loss as a function of aggregate distillation loss, the student loss, and the contrastive representation distillation loss.

14. The non-transitory computer-readable medium of claim 9, wherein the student and teacher NER models are neural networks.

15. The non-transitory computer-readable medium of claim 9, wherein one or more of the student and teacher NER models is a neural network with a conditional random field output layer.

16. The non-transitory computer-readable medium of claim 9, further comprising:
applying the student NER model to a second set of input data sequences to obtain tag predictions for the second set.

17. A computer system for obtaining a student named-entity recognition (NER) model from a plurality of teacher NER models with different tag sets, wherein the student NER model acquires the collective predictive capabilities of the plurality of teacher NER models, the system comprising:
one or more processors;
one or more memory units coupled to the one or more processors, wherein the one or more memory units store instructions that, when executed by the one or more processors, cause the system to perform the operations of:
receiving a tag hierarchy that combines the different tag sets of the teacher NER models, wherein the tag hierarchy includes parent and child tags for hypernym-hyponym relationships in in the tag hierarchy and wherein, in instances where the child tags of a parent tag do not encompass the full semantic space of the parent tag, the tag hierarchy includes a placeholder child tag to represent the remaining semantic space of the parent tag;
training the student NER model to predict the most fine-grained tags in the tag hierarchy by distilling knowledge from the plurality of teacher NER models such that the student NER model acquires the collective predictive capabilities of the plurality of teacher NER models, wherein training the student NER model comprises the following steps:
(a) obtaining a set of input data sequences;
(b) applying the student NER model and each of the plurality of teacher NER models to the set of input data sequences to obtain tag predictions from each of the teacher and student models, wherein, for hypernym-hyponym relationships in the tag hierarchy, the student model generates tag predictions for the child tags corresponding to the hyponyms, including any placeholder child tags;
(c) computing a distillation loss between the student model and each teacher model based on the tag predictions of the two models for each of the data sequences in the input set, wherein, in response to a teacher model being able to predict a parent tag and not the corresponding child tags, the student model's predictions for the corresponding child tags are marginalized to obtain the student NER model's prediction for the parent tag for purposes of computing the distillation loss;
(d) aggregating the distillation losses of each of the student-teacher model pairs to compute an aggregate distillation loss;
(e) computing an overall loss as a function of the aggregate distillation loss; and
(f) repeating steps (b)-(e) for a number of iterations, wherein parameters of the student NER model are adjusted with each iteration to reduce the overall loss.

18. The system of claim 17, wherein the set of input data sequences is different from the data sequences used to train the teacher NER models.

19. The system of claim 17, wherein the overall loss equals the aggregate distillation loss.

20. The system of claim 17, further comprising:
in each iteration, computing a student loss based on the student NER model's tag predictions and ground truth hard labels for data sequences in the input set; and
computing the overall loss as a function of the aggregate distillation loss and the student loss.

21. The system of claim 20, further comprising:
in each iteration, computing a contrastive representation distillation loss based on a comparison of the vector representations generated by the teacher NER models for each of the input data sequences, the vector representations generated by the student NER model for each of the input data sequences, and the vector representations generated by the student NER model for negative example data sequences; and
computing the overall loss as a function of aggregate distillation loss, the student loss, and the contrastive representation distillation loss.

22. The system of claim 17, wherein the student and teacher NER models are neural networks.

23. The system of claim 17, wherein one or more of the student and teacher NER models is a neural network with a conditional random field output layer.

24. The system of claim 17, further comprising:
applying the student NER model to a second set of input data sequences to obtain tag predictions for the second set.

* * * * *

UNITED STATES PATENT AND TRADEMARK OFFICE
CERTIFICATE OF CORRECTION

PATENT NO. : 11,487,944 B1
APPLICATION NO. : 17/031564
DATED : November 1, 2022
INVENTOR(S) : Yi Yang et al.

Page 1 of 1

It is certified that error appears in the above-identified patent and that said Letters Patent is hereby corrected as shown below:

In the Claims

• Column 9, Line 16 (Claim 1): please replace "in in the" with -- in the --

• Column 10, Line 33 (Claim 9): please replace "in in the" with -- in the --

• Column 11, Line 60 (Claim 17): please replace "in in the" with -- in the --

Signed and Sealed this
Tenth Day of January, 2023

Katherine Kelly Vidal
*Director of the United States Patent and Trademark Office*